US010321112B2

(12) United States Patent
Aflalo et al.

(10) Patent No.: US 10,321,112 B2
(45) Date of Patent: Jun. 11, 2019

(54) STEREO MATCHING SYSTEM AND METHOD OF OPERATING THEREOF

(71) Applicant: SAMSUNG ELECTRONICS CO., LTD., Suwon-si, Gyeonggi-Do (KR)

(72) Inventors: Yonathan Aflalo, Tel Aviv (IL); Ariel Orfaig, Kfar Bin-Nunn (IL); Sagi Tzur, Hertzelia (IL); Ayal Keisar, Modiin (IL); Nathan Henri Levy, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 77 days.

(21) Appl. No.: 15/485,392

(22) Filed: Apr. 12, 2017

(65) Prior Publication Data
US 2018/0020205 A1 Jan. 18, 2018

(30) Foreign Application Priority Data
Jul. 18, 2016 (KR) ........................ 10-2016-0090934

(51) Int. Cl.
*H04N 13/00* (2018.01)
*H04N 13/128* (2018.01)
(Continued)

(52) U.S. Cl.
CPC ........... *H04N 13/128* (2018.05); *G06T 7/557* (2017.01); *G06T 7/593* (2017.01); *H04N 13/133* (2018.05);
(Continued)

(58) Field of Classification Search
CPC ......... H04N 2013/0081; H04N 13/271; H04N 13/239; H04N 13/128; G06T 2207/20016;
(Continued)

(56) References Cited

U.S. PATENT DOCUMENTS 8,340,397 B2   12/2012  Jeon et al.
8,670,630 B1 *  3/2014  Kwatra ................ G06T 7/0075
                                                            358/1.2

(Continued)

FOREIGN PATENT DOCUMENTS

WO    WO 88/02518    4/1988

OTHER PUBLICATIONS

Sach et al. "A Robust Stereo Matching Method for Low Texture Stereo Images". (Year: 2009).*

*Primary Examiner* — Zhihan Zhou
(74) *Attorney, Agent, or Firm* — F. Chau & Associates, LLC

(57) ABSTRACT

A first image and a second image of an object taken with different viewing directions are received. The first image and the second image are downscaled in a ratio of a downscale factor DF to generate a first downscaled image and a second downscaled image, respectively. An edge map is generated by detecting an edge pixel from the first downscaled image. An initial cost volume matrix is generated from the first downscaled image and the second downscaled image according to the edge map. An initial disparity estimate is generated from the initial cost volume matrix. The initial disparity estimate is refined using the initial disparity estimate to generate a final disparity set. A depth map is generated from the first image and the second image using the final disparity set.

18 Claims, 11 Drawing Sheets

(51) Int. Cl.
*H04N 13/271* (2018.01)
*H04N 13/239* (2018.01)
*G06T 7/593* (2017.01)
*G06T 7/557* (2017.01)
*H04N 13/133* (2018.01)

(52) U.S. Cl.
CPC ......... *H04N 13/239* (2018.05); *H04N 13/271* (2018.05); *G06T 2207/20016* (2013.01); *G06T 2207/20072* (2013.01); *G06T 2207/20076* (2013.01); *H04N 2013/0081* (2013.01)

(58) Field of Classification Search
CPC . G06T 2207/20072; G06T 2207/20076; G06T 7/557; G06T 7/593
See application file for complete search history.

(56) References Cited

U.S. PATENT DOCUMENTS

| | | | |
|---|---|---|---|
| 8,737,723 B1 * | 5/2014 | Kwatra | G06T 7/0075 345/419 |
| 8,792,710 B2 | 7/2014 | Keselman | |
| 8,823,777 B2 | 9/2014 | Aviv et al. | |
| 9,014,463 B2 | 4/2015 | Moon et al. | |
| 2013/0170736 A1 | 7/2013 | Guo et al. | |
| 2014/0009462 A1 * | 1/2014 | McNamer | G06T 19/20 345/419 |
| 2014/0241612 A1 | 8/2014 | Rhemann et al. | |
| 2015/0104074 A1 * | 4/2015 | Vondran, Jr. | H04N 13/133 382/106 |
| 2016/0037121 A1 * | 2/2016 | Chang | H04N 13/254 348/47 |
| 2016/0142627 A1 * | 5/2016 | Chou | G06T 7/593 348/240.2 |
| 2017/0083787 A1 * | 3/2017 | Najafi Shoushtari | G06K 9/6201 |
| 2017/0098307 A1 * | 4/2017 | Chang | G06T 3/4007 |
| 2017/0178353 A1 * | 6/2017 | Smirnov | G06T 7/593 |
| 2017/0316602 A1 * | 11/2017 | Smirnov | G06T 3/0068 |
| 2018/0130220 A1 | 5/2018 | Goldentouch | G06T 1/0007 |

* cited by examiner

200-LI

200-RI

400

$$F = \begin{pmatrix} 0 & -1 & -1 & -1 & 0 \\ -1 & 4 & -4 & 4 & -1 \\ -1 & -4 & 12 & -4 & -1 \\ -1 & 4 & -4 & 4 & -1 \\ 0 & -1 & -1 & -1 & 0 \end{pmatrix}$$

STEREO MATCHING SYSTEM AND METHOD OF OPERATING THEREOF

CROSS-REFERENCE TO RELATED APPLICATION

This application claims priority under 35 U.S.C. § 119 to Korean Patent Application No. 10-2016-0090934, filed on Jul. 18, 2016 in the Korean Intellectual Property Office, the disclosure of which is incorporated by reference herein in its entirety.

TECHNICAL FIELD

The present inventive concept relates to a stereo matching system and a method of operating the stereo matching system.

DISCUSSION OF RELATED ART

Stereo matching systems reconstruct a three-dimensional (3D) image from two monoscopic images obtained from dual cameras. In doing so, the stereo matching systems requires computation power to calculate matching costs and optimization in real time. The stereo matching systems are used in various applications including a robot eye, an autonomous vehicle, a virtual reality system or a 3D game.

SUMMARY

According to an exemplary embodiment, a method of operating a stereo matching system is provided as follows. A first image and a second image of an object taken with different viewing directions are received. The first image and the second image are downscaled in a ratio of a downscale factor DF to generate a first downscaled image and a second downscaled image, respectively. An edge map is generated by detecting an edge pixel from the first downscaled image. An initial cost volume matrix is generated from the first downscaled image and the second downscaled image according to the edge map. An initial disparity estimate is generated from the initial cost volume matrix. The initial disparity estimate is refined using the initial disparity estimate to generate a final disparity set. A depth map is generated from the first image and the second image using the final disparity set.

According to an exemplary embodiment of the present inventive concept, a method of generating a three-dimensional image is provided as follows. A first image and a second image of an object is received. The first image and the second image of the object is taken with different viewing directions. Each of the first image and the second image includes W column pixels and H row pixels. The first image and the second image are downscaled in a in a ratio of a downscale factor DF to generate a first downscaled image and a second downscaled image, respectively. Each of the first image and the second image includes W/DF column pixels and H row pixels. An initial cost volume matrix of the first downscaled image and the second downscaled image with an initial disparity set is generated by calculating a cost for an edge pixel of the first downscaled image. The initial cost volume matrix has a dimension of $H \times (W/DF) \times d_{max}$, where $d_{max}$ is a maximum initial disparity of the initial disparity set. A dynamic program is performed on the initial cost volume matrix to search an initial disparity estimate.

According to an exemplary embodiment of the present inventive concept, a stereo matching system includes a smoothing filter, an edge detector, a cost volume matrix generator and a disparity estimator. The smoothing filter receives a first image and a second image, generating a first downscaled image and a second downscaled image in a ratio of a downscale factor DF. The edge detector receives the first downscaled image and generates an edge map. A cost volume matrix generator receives the first downscaled image and the second downscaled image, generating an initial cost volume matrix. The cost volume matrix generator computes a cost for an edge pixel and assigns a predetermined maximum cost value for a non-edge pixel. The disparity estimator receives the initial cost volume matrix and generates an initial disparity estimate.

BRIEF DESCRIPTION OF DRAWINGS

These and other features of the present inventive concept will become more apparent by describing in detail exemplary embodiments thereof with reference to the accompanying drawings of which.

DETAILED DESCRIPTION OF EXEMPLARY EMBODIMENTS

Exemplary embodiments of the present inventive concept will be described below in detail with reference to the accompanying drawings. However, the inventive concept may be embodied in different forms and should not be construed as limited to the embodiments set forth herein. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present.

Figure 1:
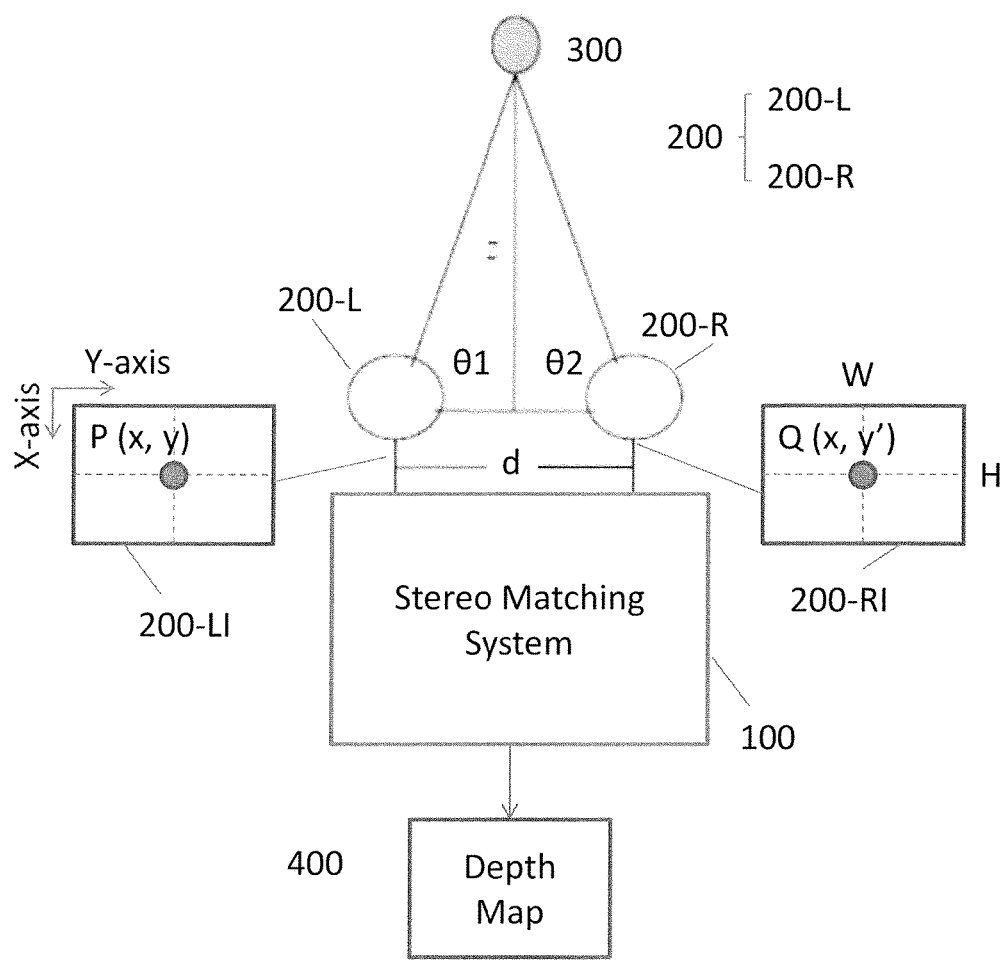
FIG. 1 shows a stereo matching system according to an exemplary embodiment of the present inventive concept.

FIG. 1 shows a stereo matching system 100 according to an exemplary embodiment of the present inventive concept.

A stereo camera 200 includes a left camera 200-L and a right camera 200-R having different viewing directions to an object 300. The left camera 200-L generates a left image 200-LI from the object 300 at a first view direction θ1 thereto. For example, the left image 200-LI includes a left pixel P (x, y) corresponding to the object 300.

The right camera 200-R generates a right image 200-RI from the object 300 at a second view direction image θ2 thereto. For example, the right image 200-RI includes a right pixel Q (x, y') corresponding to the object 300.

In this case, the left image 200-LI may be referred to as a reference image, and the right image 200-RI may be referred to as a matching image. The present inventive concept is not limited thereto. For example, the right image 200-RI may be used as a reference image, and the left image 200-LI may be used as a matching image.

In an exemplary embodiment, the left image 200-LI includes a plurality of column pixels and a plurality of row pixels. Each column pixel include a plurality of pixels arranged along a vertical direction (for example, X-axis). Each row pixel includes a plurality of pixels arranged along a horizontal direction (for example, Y-axis). In an exemplary embodiment, a number of the plurality column pixels is W, and a number of the plurality of row pixels is H. The right image 200-RI include the same number of column pixels and the same number of row pixels.

For the convenience of a description, the left pixel P (x, y) and the right pixel Q (x, y') are matching pixels taken from the same part of the object 300 and viewed at different viewing directions θ1 and θ2 from the stereo camera 200. Due to the different viewing directions θ1 and θ2, the matching pixels P (x, y) and Q (x, y') may have the different vertical coordinates. For example, the vertical coordinate y' of the right pixel Q (x, y') is equal to a value of x+$d_k$, where $d_k$ represents a disparity with reference to the vertical coordinate x of the left pixel P (x,y). In an exemplary embodiment, the disparity $d_k$ is between a minimum disparity $d_{min}$ and a maximum disparity $d_{max}$ within which the stereo matching system 100 searches for the matching pixels P (x, y) and Q (x, y'). For the convenience of a description, the minimum disparity $d_{min}$ is zero and the maximum disparity $d_{max}$ is a predetermined integer number greater than zero. In this case, a disparity $d_k$ is an element of a disparity set DS, where the disparity set DS={$d_1$, . . . , $d_{max}$}. The index k indicates to (k+1)$^{th}$ element of the disparity set DS. For, if $d_k$ is $d_1$, the pixel Q (x, y+$d_0$) is one pixel away from the pixel P (x, y); if $d_k$ is $d_2$, the pixel Q (x, y+$d_1$) is two pixels away from the pixel P (x, y); and if $d_k$ is $d_{max}$, the pixel Q (x, y+$d_{max}$) is $d_{max}$ pixels away from the pixel P (x, y). Hereinafter, the disparity $d_{max}$ may be referred to as a maximum disparity MD.

The disparity $d_k$ refers to the distance between the two matching pixels P (x,y) and Q (x, y') in the left image 200-LI and the right image 200-RI, respectively. In an exemplary embodiment, the disparity $d_k$ represents a number of pixels between a pixel of the reference image and a pixel of the matching image.

The stereo matching system 100 performs a matching operation on every pixel in the left image 200-LI and the right image 200-RI to generate a depth map 400 for the left image 200-LI and the right image 200-RI. The depth map 400 may include a depth z for pixels of the left image 200-LI. For example, when the stereo matching system 100 finds the matching pixels P (x, y) and Q (x, y'), the disparity $d_k$ of the left pixel P (x, y) is converted to a depth z of the left pixel P (x, y). The depth z is disproportional to the disparity $d_k$.

In an exemplary embodiment, the stereo matching system 100 reconstruct a three dimensional (3D) image from two monoscopic images 200-LI and 200-RI by searching disparities between matching pixels of the images 200-L and 200-R taken at different viewing directions θ1 and θ2.

The stereo matching system 100 may be implemented in a hardware including a field programmable gate array (FPGA) or an application-specific integrated circuit (ASIC), or implemented in a software using a general purpose computer system or a combination thereof. The stereo matching system 100 may operate at a faster speed in a hardware implementation compared to in a software implementation but at a higher design cost. For real-time applications, due to the speed requirement, the stereo matching system 100 may be implemented in hardware or part of the stereo matching system 100 may be implemented using hardware.

Figure 2A:
FIGS. 2A to 2C show two monoscopic images taken from a stereo camera and a depth map generated from a stereo matching system according to an exemplary embodiment of the present inventive concept.
Figure 2B:
Figure 2C:
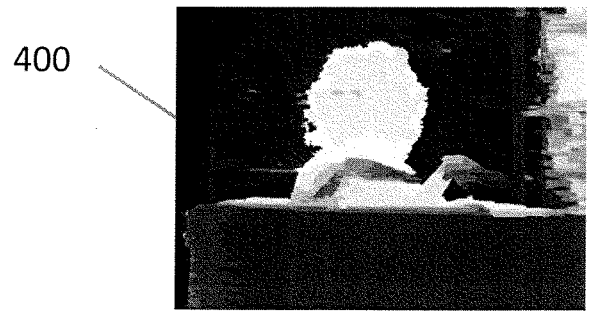

FIGS. 2A to 2C shows two monoscopic images taken from the stereo camera 200 and a depth map 400 generated from the stereo matching system 100 according to an exemplary embodiment. FIGS. 2A and 2B show an exemplary left image 200-LI and an exemplary right image 200-RI, respectively. Upon the receipt of the monoscopic images 200-LI and 200-RI, the stereo matching system 100 generates the depth map 400 of FIG. 2C.

The depth map 400 may be used to reconstruct a 3D image in various applications including a robot eye, an autonomous vehicle, a virtual reality system or a 3D game.

Figure 3:
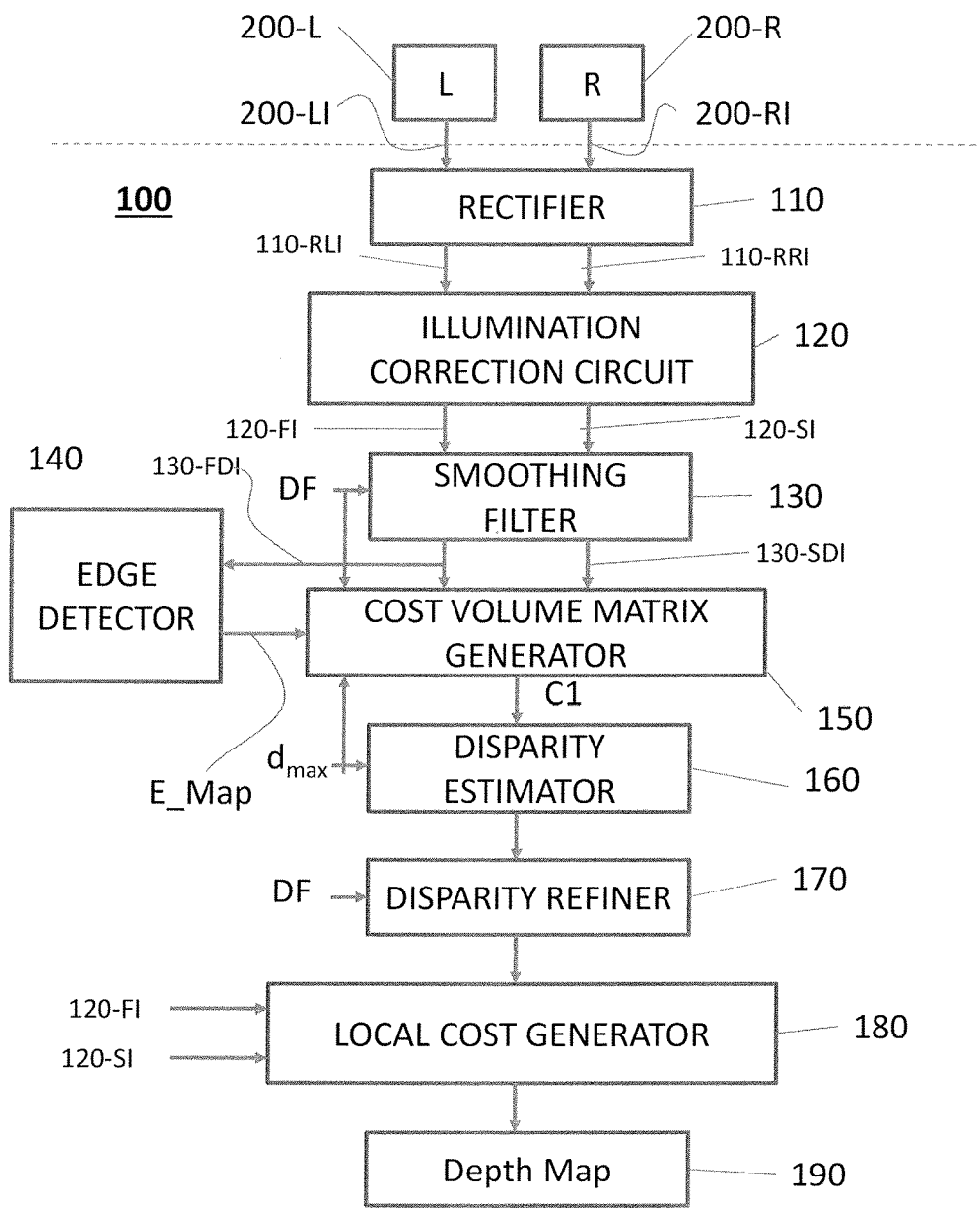
FIG. 3 shows a block diagram of the stereo matching system of FIG. 1 according to an exemplary embodiment of the present inventive concept.
Figure 12:
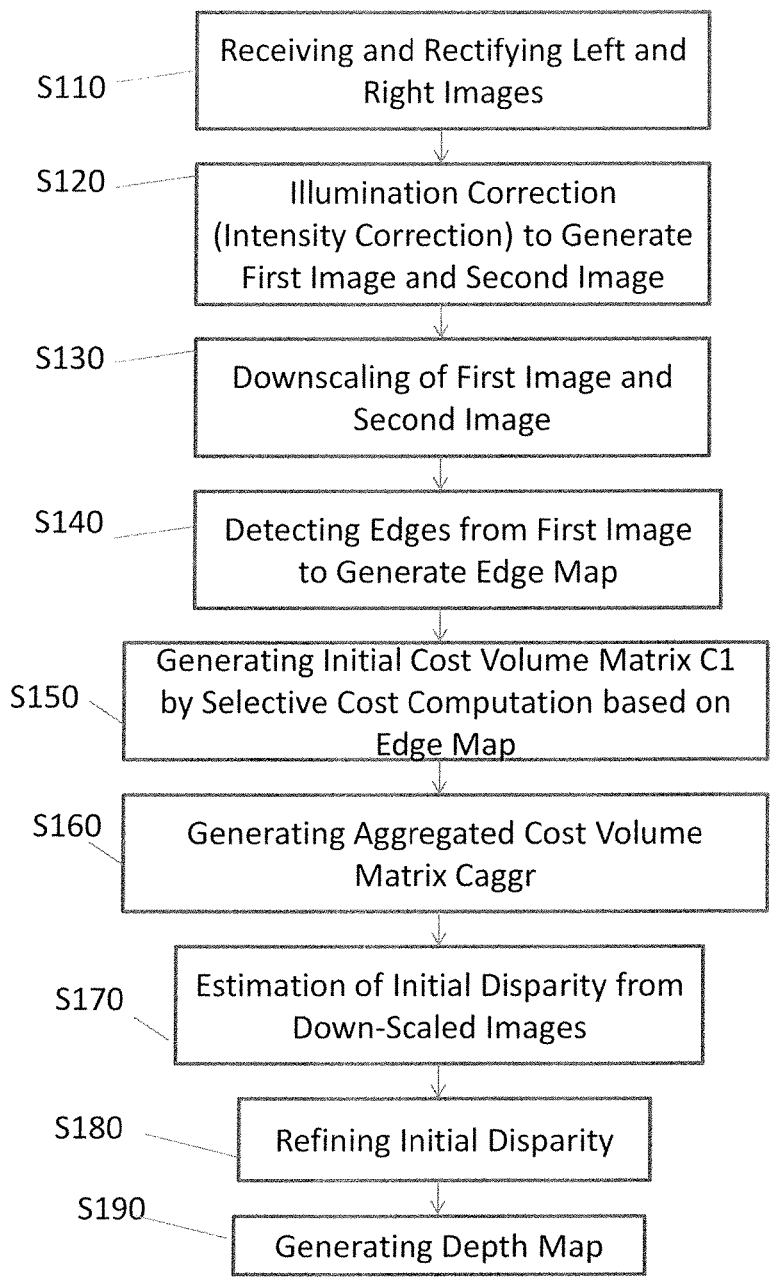
FIG. 12 is a flowchart describing an operation of the stereo matching system 100 of FIG. 1 according to an exemplary embodiment of the present inventive concept.

FIG. 3 shows a block diagram of the stereo matching system 100 of FIG. 1 according to an exemplary embodiment of the present inventive concept. For the convenience of a description, the operation of the stereo matching system 100 will be described together with reference to FIG. 12. FIG. 12 is a flowchart describing the operation of the stereo matching system 100 of FIG. 1 according to an exemplary embodiment of the present inventive concept.

In FIG. 3, the stereo matching system 100 includes a rectifier 110. The rectifier 110 receives the left image 200-LI and the right image 200-RI, generating a rectified left image 110-RLI and a rectified right image 110-RRI from the left image 200-LI and the right image 200-RI, respectively. (Step S110 of FIG. 12).

The rectifier 110 transforms the coordinates of pixels in the left image 200-LI and the right image 200-RI so that the rectified left image 200-RLI and the rectified right image 200-RRI meet an epipolar constraint among pixels in each of the rectified left image 200-RLI and the rectified right image 200-RRI. In this case, the matching pixels P (x, y) and Q (x, y') of FIG. 1 corresponding to a point of the object 300 may have the same horizontal coordinate x in the rectified left image 110-RLI and the rectified right image 110-RRI. Accordingly, the finding of the disparity $d_k$ of the pixel Q (x, y') with respect to the pixel P (x, y) is reduced to an one-dimensional calculation.

The stereo matching system 100 further includes an illumination correction circuit 120 that performs an illumination correction on the left image 110-LI and the right image 110-RI (Step S120 of FIG. 12). It is assumed that matching pixels between the rectified left image 110-RLI and the rectified right image 110-RRI have the same intensity. For example, the matching pixels P (x, y) and Q (x, y') have the same intensity.

The cameras 200-L and 200-R may be built using heterogeneous cameras, or cameras that have not been perfectly calibrated. This leads to differences in intensity (or luminance) when the same part of the object are viewed with different cameras 200-L and 200-R. Moreover, camera distance and positioning from an object also affect intensity. In other words, the same surface of the object 300 may reflect light differently when viewed from different viewing directions θ1 and θ2. Such intensity differences may be characterized with low frequency. The low frequency due to the intensity differences may be additive to frequencies representing pixels of the rectified left image 110-RLI and the rectified right image 110-RRI.

Figure 4:
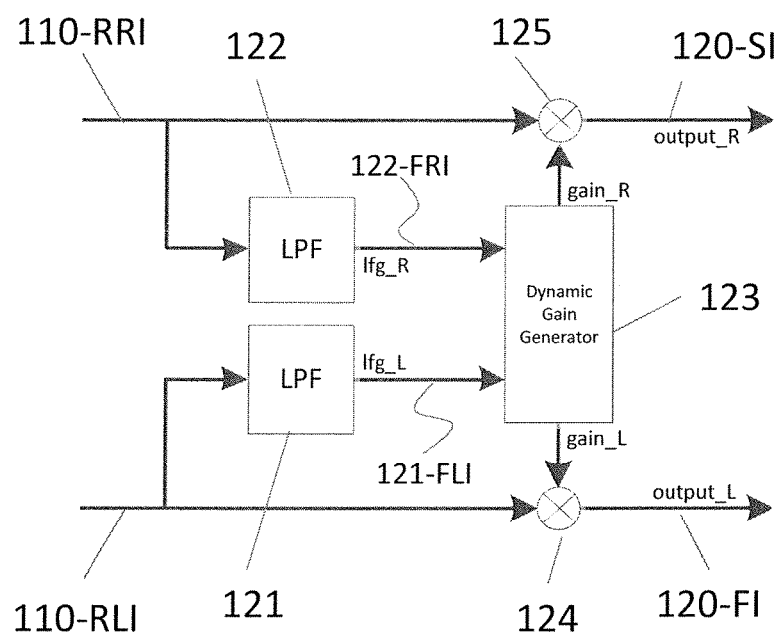
FIG. 4 shows a block diagram of an illumination correction circuit of FIG. 3 according to an exemplary embodiment of the present inventive concept.

FIG. 4 shows a block diagram of the illumination correction circuit 120 according to an exemplary embodiment of the present inventive concept. The illumination correction circuit serves to compensate differences in intensities between the left image and the right image from the left camera 200-L and the right camera 200-R, respectively.

In FIG. 4, the illumination correction circuit 120 includes a left low-pass filter 121, a right low-pass filter 122 and a dynamic gain generator 123. The left low-pass filter 121 and the right low-pass filter 122 receive the rectified left image 110-RLI and the rectified right image 110-RRI, respectively. Since the rectified left image 110-RLI and the rectified right image 110-RRI are rectified, the left low-pass filter 121 and the right low-pass filter 122 may include an one-dimensional (1D) low-pass filter.

The left low-pass filter 121 and the right low-pass filter 122 generate a low-pass-filtered left image 121-FLI and a low-pass-filtered right image 122-FRI, respectively. In this case, the left low-pass filter 121 may remove the low frequency due to the intensity differences from the rectified left image 110-RLI, passing the low-pass-filtered left image 121-FLI to the dynamic gain generator 123; and the right low-pass filter 122 may remove the low frequency due to the intensity differences from the rectified right image 110-RRI, passing the low-pass-filtered right image 122-FRI to the dynamic gain generator 123.

It is assumed that that a maximal disparity of the same object between the left image 200-LI and the right image 200-RI is less than about 5% of the image width corresponding to the plurality of W column pixels. In this case, the low-pass-filtered left image 121-FLI and the low-pass-filtered right image 122-FRI are not phase-shifted other than the distance caused by the different viewing directions θ1 and θ2 to the object 300. In other words, the low-pass-filtered left image 121-FLI and the low-pass-filtered right image 122-FRI are shifted to each other by a disparity due to the different viewing directions θ1 and θ2.

To compensate the difference in intensities between the rectified left image 110-RLI and the rectified right image 110-RRI, the dynamic gain generator 123 generates a right gain$^{(r)}$ and a left gain $g^{(l)}$ for each pixel using the following:

$$g^{(r)} = \max\left\{1, \frac{I_{LPF}^{(l)}(m, n)}{I_{LPF}^{(r)}(m, n)}\right\} \geq 1,$$

$$g^{(l)} = \max\left\{1, \frac{I_{LPF}^{(r)}(m, n)}{I_{LPF}^{(l)}(m, n)}\right\} \geq 1,$$

where $l_{LPF}^{(l)}$(m, n) represents an intensity for a pixel located at (m,n) in the rectified left image 110-RLI and $l_{LPF}^{(r)}$(m, n) represents for a pixel located at (m,n) in the rectified right image 110-RRI.

The illumination correction circuit 120 also multiplies 110-RLI and the left gain $g^{(l)}$ using a multiplier 124 to generate a first image 120-FI. The illumination correction circuit 120 multiplies the 110-RRI and the right gain $g^{(r)}$ using a multiplier 125 to generate a second image 120-SI.

The matching pixels P (x, y) and Q (x, y') of the first image 120-FI and the second image 120-SI, respectively, has the same intensity. For example, the first image 120-FI corresponds to the left image 200-LI processed through the rectifier 110 and the illumination correction circuit 120; the second image 120-SI corresponds to the right image 200-RI processed through the rectifier 110 and the illumination correction circuit 120.

The stereo matching system 100 further includes a smoothing filter 130. The smoothing filter 130 downscales the first image 120-FI and the second image 120-SI in a ratio of a downscale factor DF. (Step S130 of FIG. 12). The smoothing filter 130 generates a first downscaled image 130-FDI and a second downscaled image 130-SDI from the first image 120-FI and the second image 120-SI, respectively.

Figure 5:
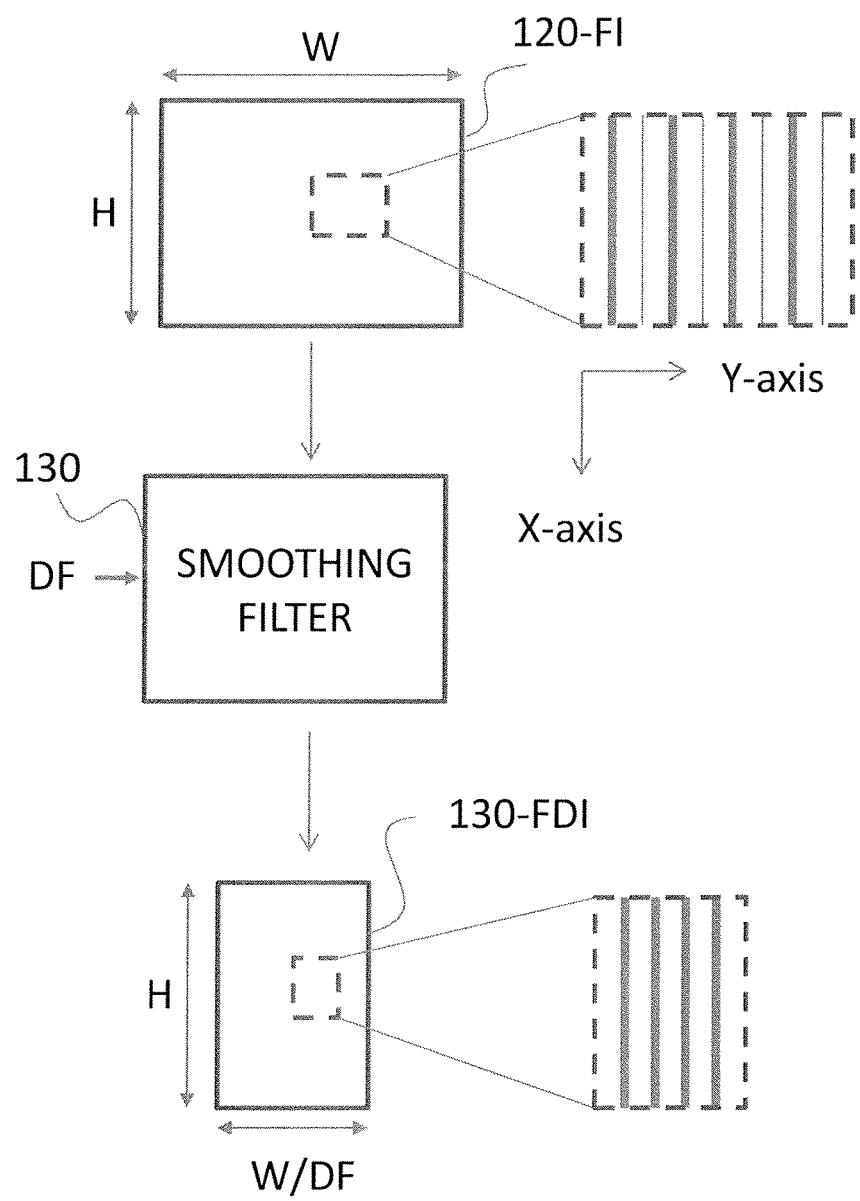
FIG. 5 is a conceptual diagram showing an operation of a smoothing filter of FIG. 3 according to an exemplary embodiment of the present inventive concept.

FIG. 5 is a conceptual diagram showing an operation of the smoothing filter 130 of FIG. 3 according to an exemplary embodiment of the present inventive concept.

For the convenience of a description, FIG. 5 shows the smoothing filter 130 generating the first downscaled image 130-FDI from the first image 120-FI. The smoothing filter 130 also generates the second downscaled image 130-SDI from the second image 120-SI as shown in FIG. 3.

In FIG. 5, the first image 120-FI includes a plurality of W pixel columns and a plurality of H pixel rows. For example, the first image 120-FI is formed of a plurality of W×H pixels. The smoothing filter 130 generates the first downscaled image 130-FDI. The first downscaled image 130-FDI is formed of the plurality of H row pixels as the first image 120-FI, and a plurality of (W/DF) column pixels smaller than the number of the plurality of W column pixels in the first image 120-FI.

In an exemplary embodiment, the first downscaled image 120-FDI is downscaled in a horizontal direction only (for example, in an Y-axis) so that the number of H row pixels of the first downscaled image 130-FDI is the same with the number of H row pixels of the first image 120-FI and the number of the plurality of (W/DF) column pixels of the first downscaled image 130-FDI is reduced to (W/DF) smaller than the number of the plurality of W column pixels of the first image 120-FI.

For example, if the downscale factor DF is two (2) and if the number of the plurality of H row pixels is 512 and if the number of the plurality of W column pixels is 512, the first downscaled image 130-FDI includes 512 pixel rows and 256 pixel columns. In this case, the number of the pixel rows in the first image 120-FI is reduced from 512 to 256 in the first downscaled image 130-FDI.

In an exemplary embodiment, the first downscaled image 130-FDI is formed of every DF$^{th}$ column pixels of the plurality of W column pixels of the first image 120-FI. For example, when the downscale factor DF is two (2), the first downscaled image 130-FDI is formed of every second column pixels of the plurality of W column pixels of the first image 120-FI as shown in FIG. 5 without including the other column pixels of the first image 120-FI. In FIG. 5, the thicker lines of a dashed box correspond to column pixels that remain in the downscaled image 130-FDI.

The description with respect to the first downscaled image 130-FDI is applicable to the second down scaled image 130-SDI. Accordingly, if the downscale factor DF is two (2) and if the number of the plurality of H row pixels is 512 (for example, H=512) and if the number of the plurality of W column pixels is 512 (for example, W=512), the second downscaled image 130-SDI includes 512 pixel rows and 256 pixel columns. In this case, the second downscaled image 130-SDI may include every second column pixels of the plurality of W column pixels of the second image 120-SI without including the other column pixels of the second image 120-SI.

In an exemplary embodiment, the first downscaled image 130-FDI and the second downscaled image 130-SDI may have the same resolution. For example, each of the first downscaled image 130-FDI and the second downscaled image 130-SDI has H×(W/DF) pixels.

The stereo matching system 100 further includes an edge detector 140. The edge detector 140 generates an edge map E_Map. (Step S140 of FIG. 12). The edge map E_Map is a H×W/DF matrix of which each entry is referenced as E_Map (i,j) where i and j represent a coordinate of a row pixel and a coordinate of a column pixel, respectively. In this case, i is an integer number from 0 to H−1, and j is an integer number from 0 to (W/DF)−1. For example, if a number of the plurality of H row pixels is 512 and if a number of the plurality of (W/D) column pixels is 256, i is any integer number between 0 and 511, inclusive, and j is any integer number from 0 to 255, inclusive. A pixel having coordinates i and j is represented as a pixel P (i,j).

The edge map E_Map may store edge-likelihood scores for each pixel of the first downscaled image 130-FDI. Each entry E_Map (i,j) stores a value of '1' or a value of '0'. The value of '1' indicates to an edge pixel; and the value of '0' indicates to an non-edge pixel. The present inventive concept is not limited thereto.

For example, an entry of E_Map (100,100) has a value of '1' or '0' for its corresponding pixel P (100, 100) of the first downscaled image 130-FDI. If the edge detector 140 determines the pixel P (100,100) as an edge pixel, the E_Map (100,100) stores the value of '1'; otherwise, the E_Map (100,100) stores the value of '0' to represent that the pixel P (100,100) is a non-edge pixel.

The edge detector 140 may operate using an edge detection algorithm such as a Canny algorithm, a Canny-Deriche algorithm, a differential algorithm, and a Sobel algorithm. The operation of the edge detector 140 will be described with reference to FIGS. 6 to 8.

Figure 6:
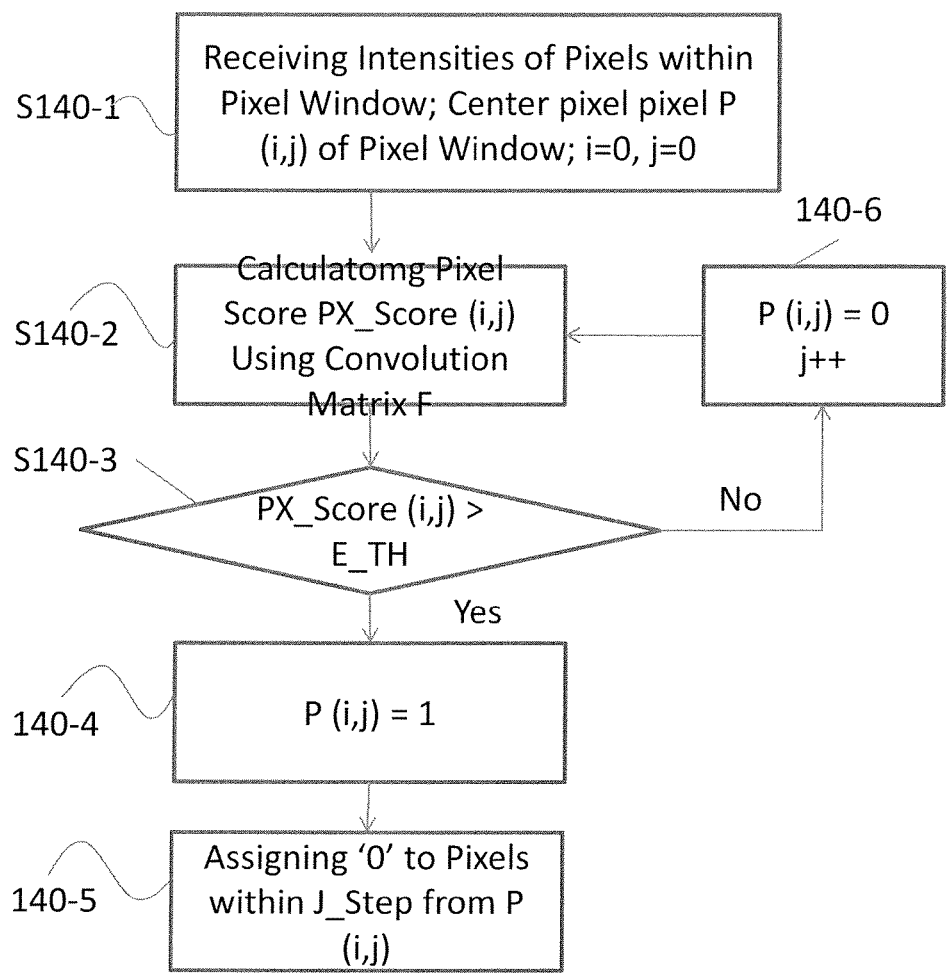
FIG. 6 shows a flowchart of generating an edge map according to an exemplary embodiment of the present inventive concept.
Figures 7, 8:
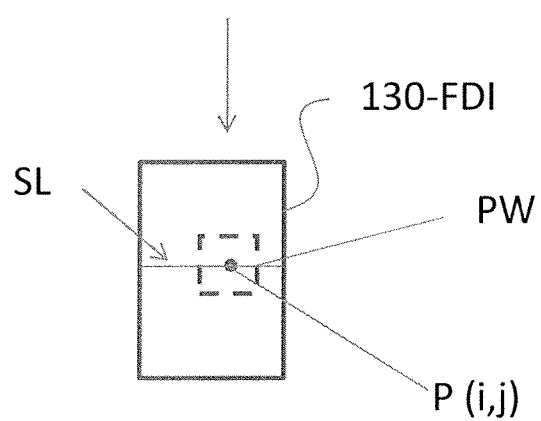
FIG. 7 shows a convolution matrix according to an exemplary embodiment of the present inventive concept.
FIG. 8 shows a pixel window according to an exemplary embodiment of the present inventive concept.

FIG. 6 shows a flowchart of generating the edge map E_Map according to an exemplary embodiment of the present inventive concept. FIG. 7 shows a pixel window PW according to an exemplary embodiment of the present inventive concept. FIG. 8 shows a convolution matrix F according to an exemplary embodiment of the present inventive concept.

In step S140-1, the edge detector 140 receives intensities of pixels within a pixel window PW from the first downscaled image 130-FDI. The pixel window PW has a size of 5×5 pixels, for example, and its center corresponds to a pixel P (i,j) of the first downscaled image 130-FDI. The pixel P (i, j) may be referred to as a center pixel P (i, j). The intensities of the pixels selected by the pixel window PW are entries of an intensity matrix I. The pixels selected pixel window PW surround the center pixel P (i, j), and may be referred to as neighboring pixels of the center pixel P (i, j). The present inventive concept is not limited thereto. For example, the size of the pixel window PW may have various sizes.

In an exemplary embodiment, the edge detector 140 slides the pixel window PW along a scanline of the first downscaled image FDI 130-FDI to detect edge pixels. The scanline SL corresponds to a pixel row. For example, the center pixel P (i, j) of the pixel window PW is one of pixels of the scanline SL.

In step S140-2, the edge detector 140 calculates a pixel score PX_Score (i, j) of the pixel P (i, j) as follows:

$$PX\_Score(i,j)=F*I.$$

The operator '*' represents a convolution operation in which intensities of neighboring pixels of the pixel P (i,j) are added, weighted by the convolution matrix F.

The convolution matrix F has entries having weight for corresponding entries of the intensity matrix I.

It is assumed that each of the convolution matrix F and the intensity matrix I is a 5 ×5 matrix, as shown in FIGS. 7 and 8, respectively. The present inventive concept is not limited thereto. The convolution matrix F may have various dimensions and weights.

In step S140-3, it is determined that the center pixel P (i,j) is an edge pixel or a non-edge pixel by comparing the pixel score PX_Score (i,j) with an edge threshold value E_TH. If the pixel score PX_Score (i,j) is greater than the edge threshold value E_TH, the edge detector 140 determines the center pixel P (i,j) as an edge pixel, storing a value of '1' to a corresponding entry of the edge map E_Map (in Step S140-4) and proceeding to step S140-5. In step S140-5, the edge detector 140 assigns a value of '0' to pixels adjacent to the center pixel P (i,j) and within a predetermined range step J_Step from the center pixel P (i,j) in a row direction. In an exemplary embodiment, the row direction is the same direction along which the edge detector 140 slides through using the pixel window PW.

For example, it is assumed that the edge detector 140 determines a center pixel P (100, 100) as an edge pixel and the predetermined range step J_Step is 5. In this case, the edge detector 140 stores a value of '1' to the entry E_Map (100,100) of the edge map E_Map, and a value of '0' to the next five entries of the edge map E_Map. The next five entries include E_Map (100, 101), E_Map (100, 102), E_Map (100, 103), E_Map (100, 104) and E_Map (100, 105). In this case, the entry E_Map (100,101) of the edge map E_Map corresponds to a pixel P (100, 101) adjacent to the pixel P (100, 100) and within the predetermined step J_Step; the entry E_Map (100,102) corresponds to a pixel P (100, 102) adjacent to the pixel P (100, 100) and within the predetermined step J_Step; the entry E_Map (100,103) corresponds to a pixel P (100, 103) adjacent to the pixel P (100, 100) and within the predetermined step J_Step; the entry E_Map (100,104) corresponds to a pixel P (100, 104) adjacent to the pixel P (100, 100) and within the predetermined step J_Step; and the entry E_Map (100,105) corresponds to a pixel P (100, 105) adjacent to the pixel P (100, 100) and within the predetermined step J_Step. The size of the predetermined range step J_Step may be empirically set.

In step S140-3, if the pixel score PX_Score (i, j) is not greater than the edge threshold value E_TH, the edge detector 140 determines the pixel P (i, j) as a non-edge pixel, proceeding to step 140-6. In step 140-6, the edge detector 140 assigns a value of '0' to a corresponding entry of the edge map E_Map and then moves to the next pixel of the pixel P (i,j) by increasing a value of j (coordinate in a horizontal direction) by 1, for example.

In an exemplary embodiment, the edge detector 140 may slide the pixel window PW over the entire pixels of the first downscaled image 130-FDI. The steps of FIG. 6 may be repeated until the pixel window PW slides through the first downscaled image 130-FDI from a first pixel (for example, P (0,0)) to a last pixel (for example, P (511, 255)), if the first downscaled image 130-FDI has 512×256 pixels. In an exemplary embodiment, if the pixel window PW selects pixels less than the size of the pixel window PW, the operation of FIG. 6 may be skipped until the pixel window PW selects pixels filling the pixel window PW. For example, if the center pixel P (x, y) is P (0, 0), the stereo matching system 100 may skip the operation of FIG. 6 for the pixel P (0, 0) and proceed to the next pixel.

The stereo matching system 100 further includes a cost volume matrix generator 150. The cost volume matrix generator 150 receives the first downscaled image 130-FDI and the second downscaled image 130-SDI to generate an initial cost volume matrix C1 using various algorithms. (Step S150 of FIG. 12). The initial cost volume matrix C1 has a dimension of H×(W/DF)×($d_{max}$/DF) as shown in FIG. 8A. The definition of H, W, and DF is described with reference to FIG. 5, and $d_{max}$ is the maximum disparity of the disparity set DS that the stereo matching system 100 searches to find matching pixels.

The cost volume matrix generator 150 also receives the edge map E_Map from the edge detector 140. The cost volume matrix generator 150 reads through the edge map E_Map and determines whether computation of a cost for a pixel is to be performed. In an exemplary embodiment, the cost volume matrix generator 150 performs selectively the computation of the cost based on the edge map E_Map. For example, if the value of an entry E_Map (i,j) of the edge map E_Map is '1', the cost volume matrix generator 150 calculates entries C1 (i,j,$idc_m$) of the initial cost volume matrix C1 using an edge pixel P (i,j) of the 130-FI and a pixel Q (i, j+$idc_m$) of the 130-SI, where $idc_m$ is an initial disparity candidate of an initial disparity set IDS, The initial disparity set IDS={$idc_1$, $idc_2$, . . . , $idc_{max}$} and the element $idc_{max}$ of the initial disparity set IDS is equal to $d_{max}$/DF. The 'm' is an index to an element of the initial disparity set IDS. The element $idc_{max}$ may be referred to as a maximum initial disparity candidate. If the value of an entry E_Map (i,j) of the edge map E_Map is '0', the cost volume matrix generator 150 assigns a predetermined maximum cost value Cost Max to the entry C1 (i, j, $idc_m$) of the initial cost volume matrix C1 without computation.

According to an exemplary embodiment, the computation amount necessary to generate the initial cost volume matrix C1 is reduced since the computation of the initial cost volume matrix C1 is performed selectively on edge pixels only. Hereinafter, it will be described with reference to FIGS. 9A and 9B to what extent the computation of the cost volume matrix C is reduced.

Figure 9A:
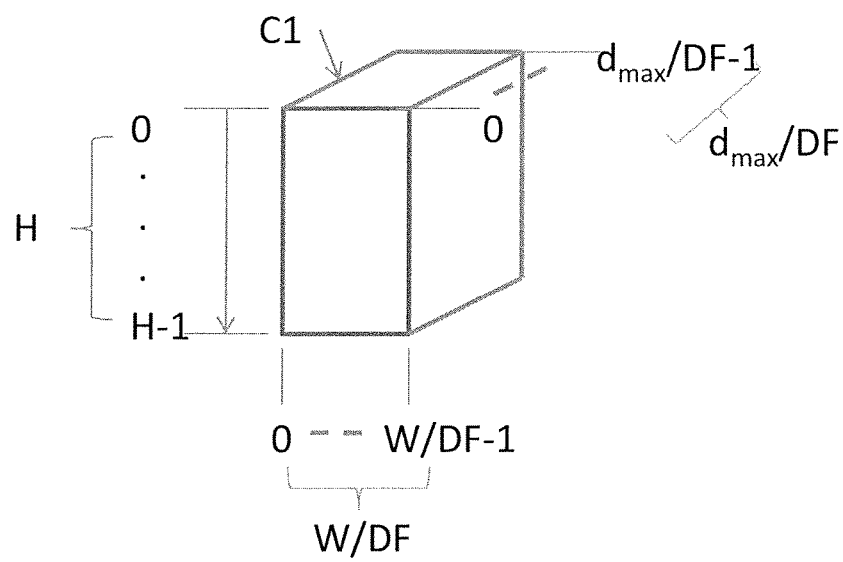
FIG. 9A shows a cost volume matrix according to an exemplary embodiment of the present inventive concept.
Figure 9B:
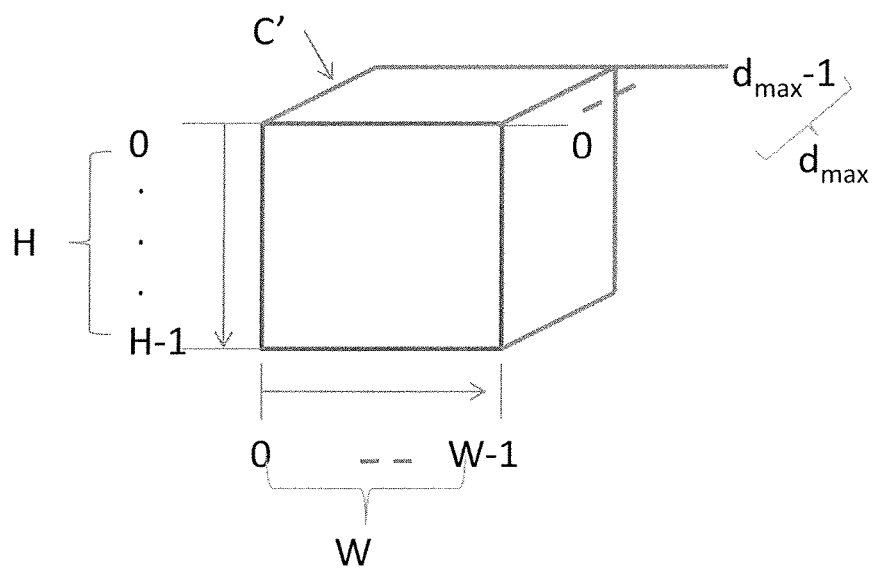
FIG. 9B shows a cost volume matrix as a comparative example to the cost volume matrix of FIG. 9A.

FIG. 9A shows the initial cost volume matrix C1 according to an exemplary embodiment of the present inventive concept. FIG. 9B shows a cost volume matrix C' as a comparative example to the initial cost volume matrix C1 of FIG. 9A.

If the left image 200-LI and the right image 200-RI are not downscaled, the cost volume matrix C' as shown in FIG. 9B is necessary to store costs of all pixels for the left image 200-LI and the right image 200-RI. According to the exemplary embodiment, the initial cost volume matrix C1 is reduced along the horizontal direction from W to (W/DF) and along a depth direction from the maximum disparity $d_{max}$ to $d_{max}$/DF compared with the cost volume matrix C' of FIG. 8B. In this case, the amount of computation in generating the initial cost volume matrix C1 is reduced to 1/$DF^2$.

For the convenience of a description, it is assumed that a number of W column pixels is 512 (for example, W=512); a number of H row pixels is 512 (for example, H=512); the maximum disparity $d_{max}$ is 10; and the downscale factor DF is 2. In the comparative example, the cost volume matrix C' of FIG. 8B has a dimension of 512×512×10; the dimension of the cost volume matrix C' is reduced to the initial cost volume matrix C having a dimension of 512×(512/2)×(10/2). The amount of computation may be reduced to one fourth (¼) compared with the comparative example if the downscale factor DF is 2.

According to an exemplary embodiment, the computation may be further reduced because the computation is performed selectively on edge pixels only, according to the edge map Edge_Map.

Figure 10:
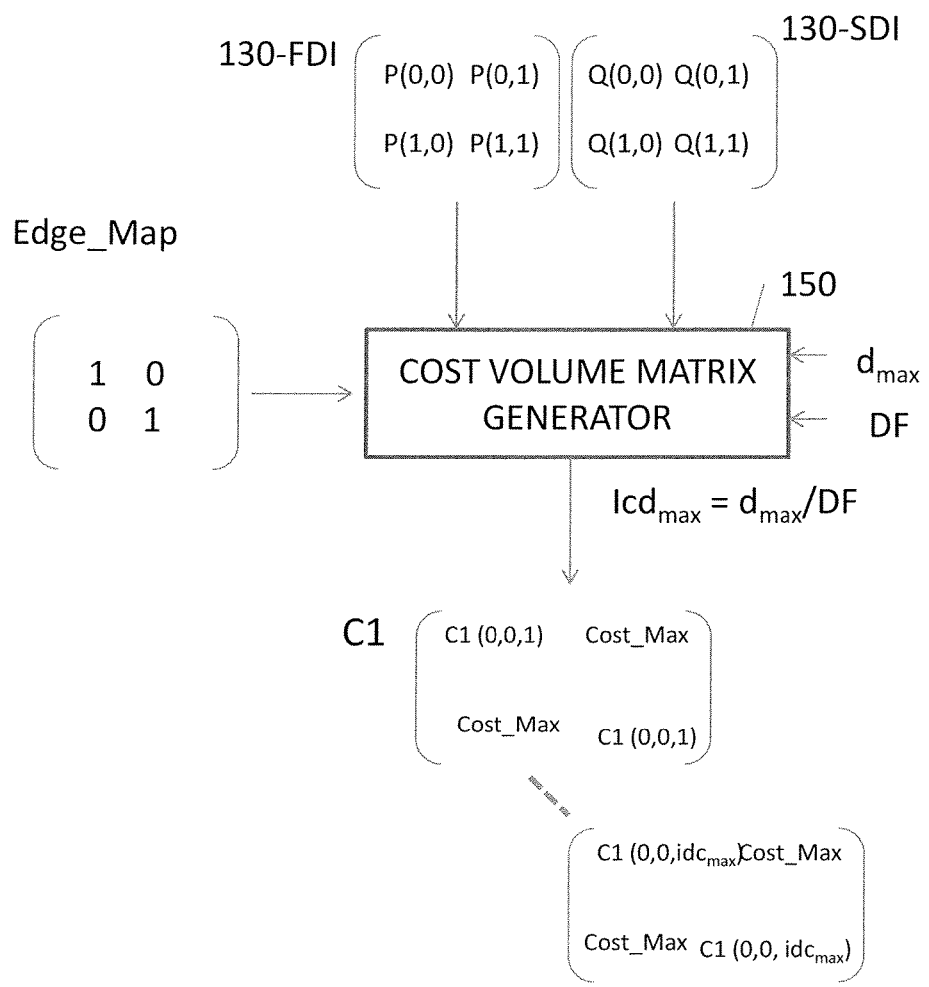
FIG. 10 is a conceptual drawing showing an operation of a cost volume matrix generator according to an exemplary embodiment of the present inventive concept.

Hereinafter, the operation of the cost volume matrix generator 150 will be described with reference to FIG. 10. FIG. 10 is a conceptual drawing showing an operation of the cost volume matrix generator 150 according to an exemplary embodiment.

In FIG. 10, the cost volume matrix generator 150 receives the first downscaled image 130-FDI and the second downscaled image 130-SDI from the smoothing filter 130 to generate the initial cost volume matrix C1. (Step S150 of FIG. 12). For the convenience of a description, the first downscaled image 130-FDI and the second downscaled image 130-SDI each has 2×2 pixels.

The cost volume matrix generator 150 also receives the edge map E_Map from the edge detector 140. For the convenience of a description, the edge map E_Map is a 2×2 matrix generated from the first downscaled image 130-FDI having 2×2 pixels as shown in FIG. 10.

The cost volume matrix generator 150 reads through the edge map E_Map. If the value of an entry E_Map (i,j) of the edge map E_Map is '1', the cost volume matrix generator 150 calculates entries C1 (i, j, $idc_m$) of the initial cost volume matrix C1. For example, for the entries E_Map (0,0) and E_Map (1,1), the cost volume matrix generator 150 calculates entries C1 (0,0,$idc_m$) and C (1,1,$idc_m$) because the entries E_Map (0,0) and E_Map (1,1) each has '1'. For the entries E_Map (0,1) and E_Map (1,0) having '0', the cost volume matrix generator 150 assigns a predetermined maximum cost value Cost_Max to entries C (0,1,$idc_m$) and C (1,0,$idc_m$). In this case, the $idc_m$ is an initial disparity candidate between 1 and $idc_{max}$, inclusive.

The values of the entries C (i, j, $idc_m$) represent the amount of dissimilarity between an edge pixel P (i,j) of the first downscaled image 130-FI and a pixel Q (i, j+$idc_m$) of the second downscaled image 130-SI. The values of the entries C (i,j,idcm) may be referred to as initial costs. If the value of an entry E_Map (i,j) of the edge map E_Map is '0', the cost volume matrix generator 150 assigns a predetermined maximum cost value Cost_Max to the entry C1 (i, j, $idc_m$) of the initial cost volume matrix C1 without computation. The greater the value of an entry C1 (i, j, $idc_m$), the more dissimilar the two pixels P (i,j) and Q (i, j+$idc_m$).

In an exemplary embodiment, the cost volume matrix generator 150 converts the initial cost volume matrix C1 to an aggregated cost volume matrix $C_{aggr}$. (Step S160 of FIG. 12). An entry $C_{aggr}$ (i, j, $idc_m$) of the aggregated cost volume matrix $C_{aggr}$ is computed using an aggregation window in an exemplary embodiment. In an exemplary embodiment, the aggregation window may have a size of 5×5 pixels. In this case, initial costs within the aggregation window may be added to an aggregated cost for a pixel corresponding to a center of the aggregation window.

In an exemplary embodiment, the computation of the initial cost volume matrix C1 and the aggregated cost volume matrix $C_{aggr}$ may be performed using an AD-Census algorithm.

The stereo matching system 100 further includes a disparity estimator 160. The disparity estimator 160 search an initial disparity estimate among the initial disparity set IDS={$idc_1$, $idc_2$, ..., $idc_{max}$}. For example, the disparity estimator 160 performs a stereo matching algorithm on the aggregated cost volume matrix $C_{aggr}$ to find matching pixels between the first downscaled image 130-FDI and the second downscaled image 130-SDI.

The stereo matching algorithm may include a global method that minimizes an energy of the entire pixels of the first downscaled image 130-FDI expressed as follows:

$$E(i, j, idc_m) = \quad \text{(Eq. 1)}$$
$$E_{data}(i, j, idc_m) + \lambda(i, j) E_{smooth-horizontal}(i, j, idc_m) +$$
$$\mu(i, j) E_{smooth-vertical}(i, j, idc_m).$$

In the equation (Eq. 1), $E_{data}(i,j,idc_m)$ stores information of the initial cost volume matrix C1. Each entry of the initial cost volume matrix C1 represents the amount of how dissimilar a pixel of the first downscaled image 130-FDI is from a pixel of the second downscaled image 130-SDI located at an initial disparity $idc_m$. In other words, $E_{data}(i,j,idc_m)$ corresponds to $C_{aggr}(i,j,idc_m)$ of the first downscaled image 130-FDI and the second downscaled image 130-SDI. $E_{smooth-horizontal}(i,j,idc_m)$ encodes the smoothness assumptions between neighboring pixels' disparities in a horizontal direction; and $E_{smooth-vertical}(i,j,idc_m)$ encodes the smoothness assumptions between neighboring pixels' disparities in a vertical direction. The coefficients $\lambda(i,j)$ and $\mu(i,j)$ has serves as penalty for horizontal smoothness and vertical smoothness, respectively, by increasing the value of $E(i,j,idc_m)$ when two adjacent pixels vertically or horizontally have different intensities greater than a predetermined magnitude.

With the energy equation (Eq. 1), the disparity estimator 160 performs a dynamic programming to search a disparity path having a minimum energy in a unit of a scanline. In an exemplary embodiment, the scanline corresponds to a pixel row having (W/DF) pixels as shown in FIG. 5.

Figure 11:
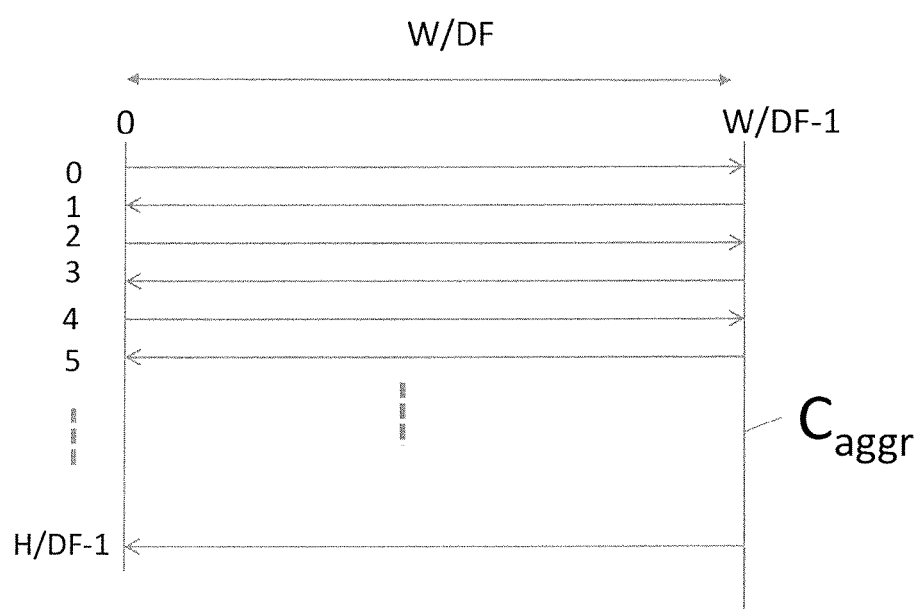
FIG. 11 shows an operation of a dynamic programming according to an exemplary embodiment of the present inventive concept.

In an exemplary embodiment, as shown in FIG. 11, the dynamic programming is performed in a first direction (for example, from left to right) on aggregated costs for even-numbered row pixels and in a second direction (for example, from right to left) on aggregated costs for odd-numbered row pixels.

For example, the dynamic programming searches a disparity path on a two-dimensional space per an $i^{th}$ scanline. The two-dimensional space is formed by initial disparity candidates $idc_m$ and an Y-coordinate j from $C_{aggr}(i,j,idc_m)$. The initial disparities idcm on the disparity path corresponds to an initial disparity estimate ide(j). Along the disparity path, the sum of the energy $E(i,j,idc_m)$ per a scanline has a minimum value.

In an exemplary embodiment, the disparity estimator 160 performs the dynamic programming on a scanline and its previous scanline adjacent to the scanline. In other words, the dynamic programming is performed in a unit of two scanlines adjacent to each other. In this case, the disparity estimator 160 searches the disparity path per a scanline with its pervious scanline. For example, the disparity estimator 160 receives entries of the aggregated cost volume matrix $C_{aggr}$ for pixels located in two scanlines to consider the vertical smoothness $E_{smooth-vertical}(i,j,idc_m)$. For example, as shown in FIG. 11, when the disparity estimator 160 scans through a third pixel row (numbered 2) in the first direction (from left to right), the disparity estimate 160 receives entries of the aggregated cost volume matrix $C_{aggr}$ for pixels located in two adjacent scanlines (numbered 1 and 2).

The disparity estimator 160 performs the dynamic programming in two steps. For example, the disparity estimator 160 scans through a scanline as shown in FIG. 11, initializing arrays for $E_{data}(j, idc_m)$, $E_{smooth-horizontal}(j,idc_m)$, $E_{smooth-vertical}(j,idc_m)$ and then backwardly propagating to find the disparity path having a minimum energy per a scanline. In this case, the disparity estimator 160 generates initial disparity estimates ide (j) for each scanline that form the disparity path. The initial disparity estimates ide (j) are one of the initial disparity candidates $idc_m(i, j)$ at each pixel of a scanline. The dynamic programming is performed along a scanline, and the x-coordinate is ignored. Accordingly, the initial disparity candidates $idc_m (i, j)$ may be expressed as $idc_m (j)$.

In an exemplary embodiment, the initial disparity estimates ide (j) may be stored in an one-dimensional array, where j is any column coordinate between 0 and W−1, inclusive.

The disparity estimator 160 has initial disparity estimates ide (j) for the $(i-1)^{th}$ scanline to calculate the energy E $(i,j,idc_m)$ for an $i^{th}$ scanline.

In an exemplary embodiment, the disparity estimator 160 performs the dynamic programming algorithm from a first scanline (for example, $0^{th}$ scanline) to a last scanline (for example, $(H-1)^{th}$ scanline).

When the disparity estimator 160 performs the dynamic programming on the aggregated cost volume matrix $C_{aggr}$ in a zig-zag manner as shown in FIG. 11, the disparity estimator 160 may be implemented more efficiently in hardware, for example, internal memories.

When the disparity estimator 160 performs the dynamic programming in the zig-zag manner, the backwardly propagating of an i-th scanline and initializing arrays for $E_{data}(j, idc_m)$, $E_{smooth-horizontal}(j,idc_m)$, $E_{smooth-vertical}(j,idc_m)$ for an (i+1) the scaneline are performed at the same time. In an exemplary embodiment, the same memory space may be used for the i-th scanline and the (i+1) the scanline. For example, while the dynamic programming for the i-th scanline is backwardly propagating, costs of pixels of the (i+1)th scanline is overwritten to its corresponding pixel of the i-th scanline which the dynamic programming applied. In this manner, while the dynamic programming for the i-th scanline is backwardly propagating, the memory space for the i-th scanline is filled with the costs for the i-th scanline in the same direction.

According to an exemplary embodiment, the calculation of the equation (Eq. 1) is performed using a disparity found in the previous scanline. Accordingly, the disparity estimator 160 is not necessary to secure memory spaces for arrays for two scanlines—for the previous scanline and for the current scanline. The disparity estimator 160 may use memory spaces efficiently.

The stereo matching system 100 further includes a disparity refiner 170. The disparity refiner 170 searches a final disparity fd using an initial disparity estimate ide(j). (Step S180).

The disparity refiner 170 receives the initial disparity estimate ide (j) for a pixel P (i,j) of each scanline and generates a final disparity set FDS for the pixel P (i,j) using the initial disparity estimate ide (j). The final disparity set FDS includes final disparity candidates $fdc_t(j)$ around a value of (DF×ide (j))—the downscale factor DF times the initial disparity estimate ide (j). For example, the final disparity set FDS for the pixel P (i,j) includes elements {DF*ide (j)−DF, DF*ide (j)−DF+1, . . . , DF*ide (j), DF*ide (j)+1, . . . , DF*ide (j)+DF} for each pixel. In this case, the 't' is an index to an element of the final disparity set FDS, where the number of the final disparity candidates in the final disparity set FDS is equal to 2*DF+1.

The stereo matching system 100 further includes a local cost generator 180. The local cost generator 180 receives the first image 120-FI and the second image 120-SI from the illumination correction circuit 120. The local cost generator 180 further receives the final disparity set FDS.

The local cost generator 180 calculates costs over the final disparity set FDS. In this case, the local cost generator 180 computes matching costs between the first image 120-FI and the second image 120-SI for each final disparity candidates of the final disparity set FDS.

Then, the local cost generator 180 determines a second matching cost volume matrix C2. In this case, the local cost generator 180 calculates each entry C2 (i, j, $fdc_t(j)$) for each pixel (i, j) using the final disparity set FDS. The entry C2 (i, j, $fdc_t(j)$) may be referred to as a second matching cost volume matrix C2.

The stereo matching system 100 further includes a depth map generator 190. The depth map generator 190 determines a final matching cost volume matrix $C_{final}$ from the second matching cost volume matrix C2. For example, the depth map generator 109 searches a local minimum final cost among the second costs C2 (i,j,$fdc_t(j)$) of the second matching cost volume C2 computed by the local cost generator 180 and determines the local minimum final cost as the final matching cost $C_{final}$ (i,j,$fdc_t(j)$) to generate the depth map generator 190. (Step S190). The final matching cost volume matrix $C_{final}$ includes final matching costs $C_{final}$(i,j, $fd_t(j)$) for each pixel (i, j).

According to an exemplary embodiment, the computation of the costs is performed only on the edges in the downscaled image, and then, an initial disparity estimates is determined from the costs using a dynamic programming, and the initial disparity estimates are refined.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of operating a stereo matching system, the method comprising:
    receiving a first image from a first camera of a stereo camera, and a second image from a second camera of a stereo camera, wherein the first and second images are of an object taken with different viewing directions;
    downscaling the first image and the second image by a smoothing filter in a ratio of a downscale factor DF to generate a first downscaled image and a second downscaled image, respectively;
    generating an edge map by detecting an edge pixel from the first downscaled image;
    generating an initial cost volume matrix from the first downscaled image and the second downscaled image according to the edge map;
    generating an initial disparity estimate from the initial cost volume matrix;
    refining the initial disparity estimate using the initial disparity estimate to generate a final disparity set; and
    generating a depth map from the first image and the second image using the final disparity set,
    wherein the first image includes a plurality of W column pixels and a plurality of H row pixels,
    wherein the first downscaled image includes a plurality of W/DF column pixels, and
    wherein the first downscaled image is formed of every $DF^{th}$ column pixels of the pluralty of W column pixels so that a resolution of the first downscaled image is reduced by 1/DF times a resolution of the first image in a row direction.

2. The method of claim 1, wherein the downscale factor DF is two (2).

3. The method of claim 1, further comprising:
    wherein the generating of the initial disparity estimate of the edge pixel includes:
    generating an initial disparity set including a plurality of initial disparity candidates, wherein a maximum initial disparity candidate of the initial disparity set is equal to $d_{max}$/DF, wherein $d_{max}$ is a maximum disparity;
    generating an initial cost volume matrix of H×(W/DF)× ($d_{max}$/DF) storing a cost value of each pixel of the first downscaled image; and
    searching the initial disparity estimate from the initial cost volume matrix.

4. The method of claim 3,
    wherein the searching of the initial disparity estimate from the initial cost volume matrix includes:
    performing an dynamic programming to find the initial disparity estimate,
    wherein the dynamic programming is performed in a unit of two scanlines adjacent to each other.

5. The method of claim 4,
    wherein the dynamic programming includes a vertical smoothness between the two scanlines.

6. The method of claim 4,
    wherein the dynamic programming is performed in a first direction on an even-numbered row pixel, and
    wherein the dynamic programming is performed in a second direction opposite to the first direction on an odd-numbered row pixel.

7. The method of claim 1,
    wherein the generating of the initial cost volume matrix further includes:
    generating an aggregated cost volume matrix from the initial cost volume matrix.

8. The method of claim 1,
    wherein the generating of the initial cost volume matrix includes:
    if a pixel is determined as an edge pixel, computing a cost for the edge pixel over an initial disparity set and storing the cost to the initial cost volume matrix; and
    if a pixel is determined as a non-edge pixel, assigning a predetermined maximum cost to the initial cost volume matrix without computing a cost.

9. The method of claim 1,
    wherein the refining of the initial disparity estimate using the first image and the second image includes:

generating a final disparity set using the initial disparity estimate;
computing a final matching cost volume using the final disparity set from the first image and the second image; and
determining a final disparity candidate of the final disparity set from a minimum final cost.

10. The method of claim 9,
wherein the final disparity set includes a plurality of final disparity candidates, and
wherein a number of the plurality of final disparity candidates is 2*DF+1.

11. The method of claim 1,
wherein the receiving of the first image and the second image further comprising:
rectifying a left image and a right image; and
compensating an intensity of the left image and an intensity of the right image to generate the first image and the second image.

12. The method of claim 11,
wherein the generating of the edge map includes:
if the edge pixel is determined, assigning a value indicating to a non-edge pixel to pixels adjacent to the edge pixel within a predetermined range step.

13. A method of generating a three-dimensional image, the method comprising:
receiving a first image from a first camera of a stereo camera, and a second image from second camera of a stereo camera, wherein the first and second images are of an object taken with different viewing directions, and wherein each of the first image and the second image includes a plurality of W column pixels and a plurality of H ow pixels;
downscaling the first image and the second image by a smoothing filter in a ratio of a downscale factor DF to generate a first downscaled image arid a second downscaled image, respectively, so that each of the first image and the second image includes a plurality of W/DF column pixels and the plurality H row pixels; and
generating an initial cost volume matrix of the first downscaled image and the second downscaled image with an initial disparity set by calculating a cost for an edge pixel of the first downscaled image,
wherein the initial cost volume matrix has a dimension of $H \times (W/DF) \times d_{max}$, and
wherein $d_{max}$ is a maximum initial disparity of the initial disparity set, and
performing a dynamic program on the initial cost volume matrix to search an initial disparity estimate.

14. The method of claim 13, further comprising:
refining the initial disparity estimate to generate a final disparity set;
calculating a final matching cost volume matrix from the first image and the second image using the final disparity set; and
searching a minimum final cost from the final matching cost volume matrix to generating a depth map.

15. The method of claim 13,
wherein the generating of the initial cost volume matrix of the first downscaled image and the second downscaled image further includes:
assigning a predetermined maximum cost to a non-edge pixel without computing a cost for the non-edge pixel.

16. The method of claim 15, further comprising:
detecting the edge pixel and the non-edge pixel from the downscaled first image.

17. A stereo matching system comprising:
a smoothing filter receiving a first image and a second image and generating a first downscaled image and a second downscaled image in a ratio of a downscale factor DF;
an edge detector receiving the first downscaled image and generating an edge map;
a cost volume matrix generator receiving the first downscaled image and the second downscaled image and generating an initial cost volume matrix, wherein the cost volume matrix generator computes a cost for an edge pixel and assigns a predetermined maximum cost value tor a non-edge pixel;
a disparity estimator receiving the initial cost volume matrix and generating an initial disparity estimate; and
a disparity refiner receiving the initial disparity estimate and generating a plurality of final disparity candidates, wherein a number of the plurality of final disparity candidates is 2*DF+1.

18. The stereo matching system of claim 17, further comprising:
a rectifier receiving a left image and a right image; and
an illumination correction circuit receiving the left image and the right image and generating the first image and the second image to compensate differences in intensities between the left image and the right image.

* * * * *